United States Patent [19]

Davis

[11] Patent Number: 4,662,671
[45] Date of Patent: May 5, 1987

[54] AIR DEFLECTOR FOR MOTOR VEHICLE
[75] Inventor: Bender A. Davis, Sandton, South Africa
[73] Assignee: Carvalette Services Africa (PTY) Limited, Johannesburg, South Africa
[21] Appl. No.: 829,875
[22] Filed: Feb. 18, 1986
[30] Foreign Application Priority Data Feb. 21, 1985 [ZA] South Africa ............... 85/1316

[51] Int. Cl.$^4$ ............................................. B60J 7/22
[52] U.S. Cl. ..................................... 296/217; 296/91; 296/1 S; 98/2.14; 16/342; 16/257
[58] Field of Search ............... 296/217, 91, 1 S; 98/2.14; 16/DIG. 13, 337, 342, 254, 257, 259; 411/155

[56] References Cited

U.S. PATENT DOCUMENTS 2,322,898  6/1943  Van Dresser .................. 296/97 K
3,388,523  6/1966  Evans ................................. 293/128
3,659,314  5/1972  Ross ..................................... 16/254
4,171,846  10/1979  Isleif et al. ......................... 296/217

FOREIGN PATENT DOCUMENTS 2357906  5/1975  Fed. Rep. of Germany ...... 296/217

Primary Examiner—Robert R. Song
Attorney, Agent, or Firm—Sughrue, Mion, Zinn, Macpeak and Seas

[57] ABSTRACT

An air deflector, suitable for mounting adjacent an opening in the roof of a motor vehicle. The air deflector comprises a body member having a leading edge and a trailing edge, a recess formed in the trailing edge, and a flap accommodated in the recess and pivotably connected to the body member on pivots at opposite ends of the flap. The body member has sockets integrally therewith at opposite ends of the recess and the pivots are received in the sockets.

7 Claims, 5 Drawing Figures

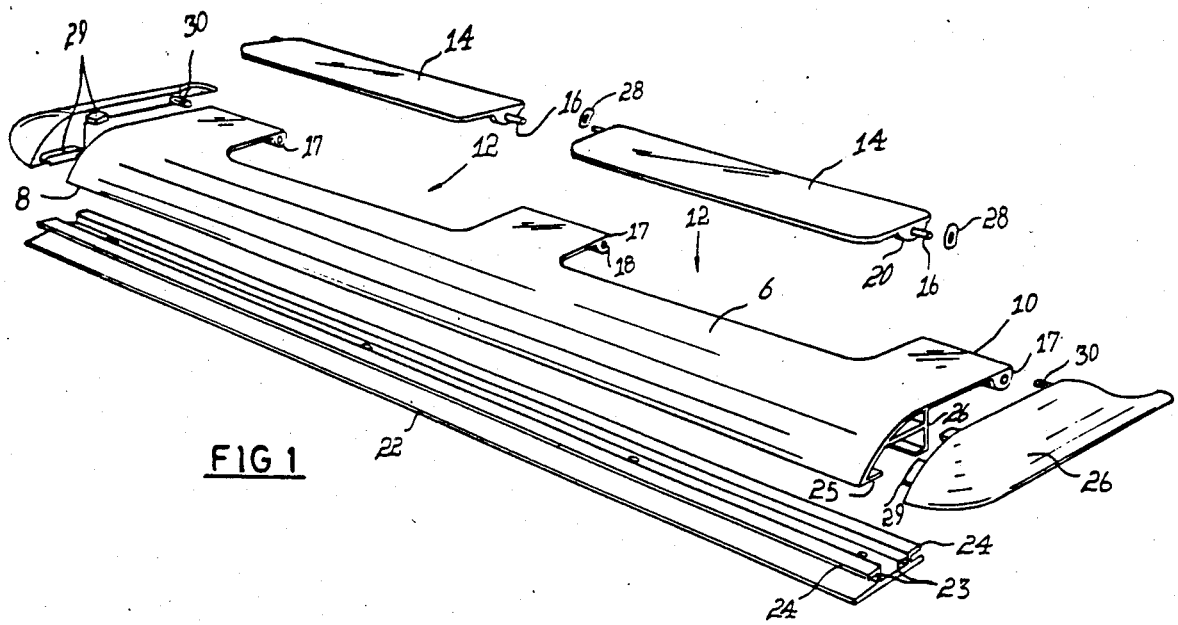
FIG 1
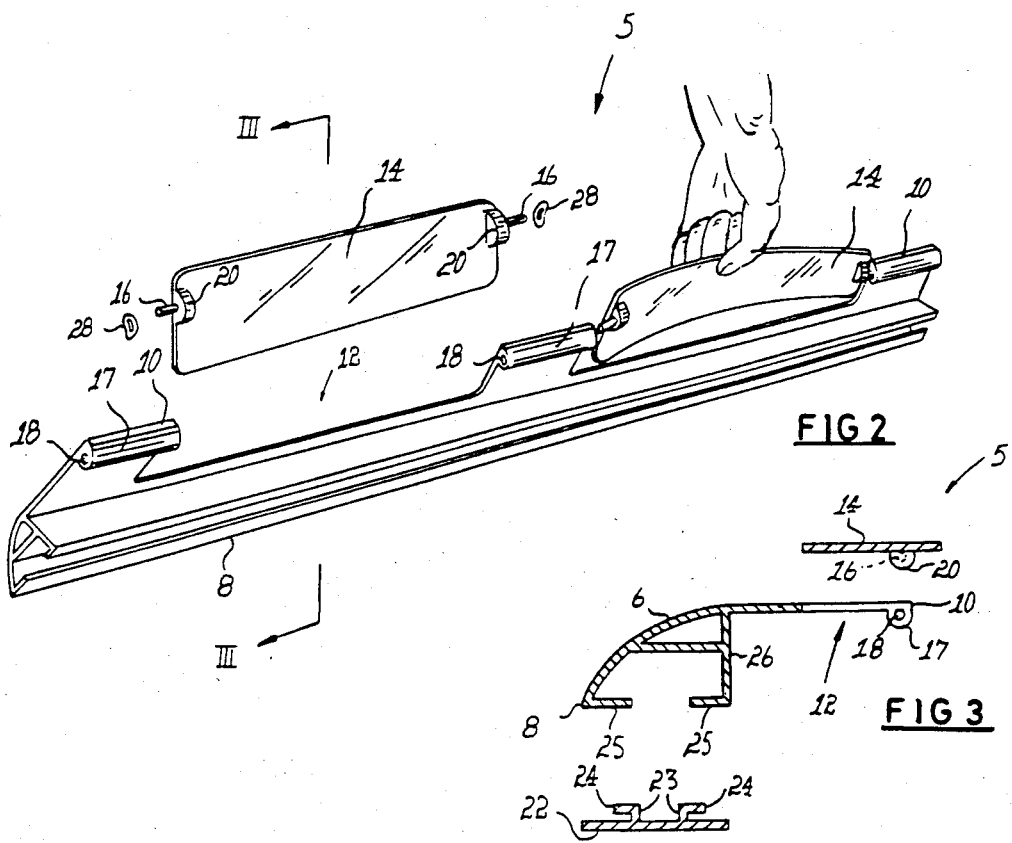
FIG 2
FIG 3

AIR DEFLECTOR FOR MOTOR VEHICLE

BACKGROUND OF THE INVENTION

This invention relates to an air deflector for use on the roof of a motor vehicle.

The roof of a motor vehicle may have an opening therein and a sliding or angularly adjustable panel may be associated with the opening to control the effective size of the opening. Such an arrangement is usually referred to as a sun roof or as an air roof. An air deflector may be provided at the leading edge of the sun or air roof.

It has been proposed that an air deflector of this kind should have an angularly adjustable flap provided in a recess formed in the trailing edge of the deflector. By adjusting the angular position of the flap the amount of air deflected into the vehicle whilst it is travelling can be regulated. A problem which has presented itself with this type of arrangement has centered around the mounting of the flap on the air deflector. If separate brackets are provided they have to be mounted on the deflector, which is labour intensive, and the brackets tend to make the construction cumbersome.

It is accordingly an object of the invention to provide an air deflector of the type described above which is of relatively simple construction.

SUMMARY OF THE INVENTION

An air deflector according to the invention, suitable for mounting adjacent an opening in the roof of the motor vehicle, comprises a body member having a leading edge and a trailing edge, a recess formed in the trailing edge, and a flap accommodated in the recess and pivotably connected to the body member on pivots at opposite ends of the flap, the body member having sockets formed integrally therewith at opposite ends of the recess, the pivots being received in the sockets.

The body member may have a rib thereon extending along the length of the body member, the rib being interrupted by the recess formed in the trailing edge, the rib having a bore in its length, the bore providing the sockets which receive the pivots on the flap. The rib is preferably provided on the underside of the body member and may have a part-circular shape in cross-section. With this form or rib, the body member may be made from an extrusion of plastics material, the recess in the trailing edge of the body member being formed therein by cutting a portion of the trailing edge therefrom.

The rib on the body member may in one form of the invention be located at the trailing edge of the body member.

The pivots on the flap may be formed integrally therewith. In such a case, the flap may be made of a resiliently flexible material such as polycarbonate to enable the flap to be bent about its length (temporarily to shorten its effective length) to permit the pivots to be inserted into the sockets whereafter the flap may be permitted to return to its original shape.

An air deflector according to the invention may include a washer having a curved plane located on each pivot of the flap to enhance frictional contact between the flap and the ends of the recess in the body member. The air deflector may include engagement formations on the underside of the body member for sliding engagement of the body member with a beading secured to the roof of the vehicle.

BRIEF DESCRIPTION OF THE DRAWINGS

A preferred embodiment of the invention will now be described by way of example, with reference to the accompanying drawings in which;

FIG. 1 is an exploded perspective view of an air deflector assembly according to the invention, FIG. 2 is a perspective view of part of the assemby of FIG. 1 seen from underneath;

FIG. 3 is a cross-section through parts of the assembly taken on line III—III of FIG. 2;

DESCRIPTION OF PREFERRED EMBODIMENTS

Figure 5:
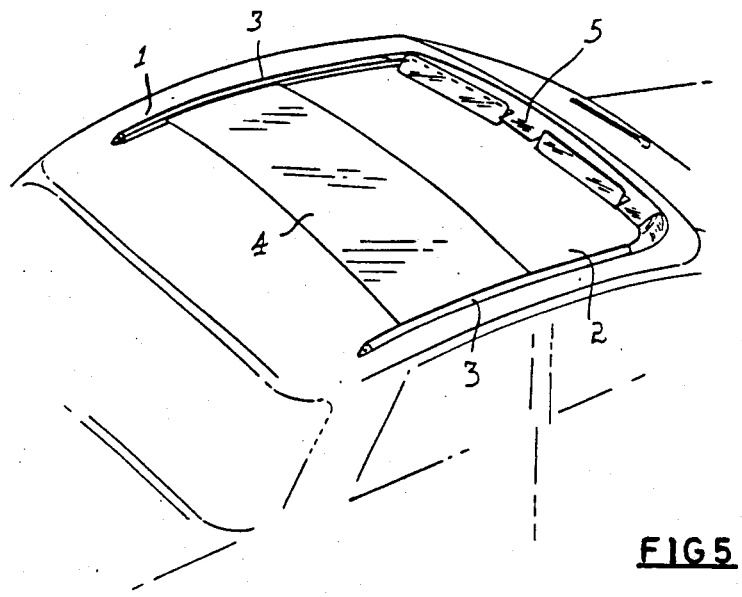
FIG. 5 illustrates the assembly of FIG. 1 located in position on the roof of a motor vehicle.

The roof 1 of a motor vehicle has an opening 2 therein which is bounded on two opposite sides by guide rails 3 (FIG. 5). The guide rails 3 serve to retain a sliding panel 4 which controls the effective size of the opening 2. At the leading end of the opening 2 an air deflector 5 according to the invention is mounted on the roof 1 to control the flow of air into the vehicle whilst it is travelling.

The air deflector 5 comprises a body part 6 having a leading edge 8 and a trailing edge 10 (FIGS. 1-4). The trailing edge 10 is interrupted by two recesses 12 formed therein. Each recess 12 accommodates a flap 14 which is pivotally connected to the body part 6 on pivots 16 at opposite ends of each flap.

In this embodiment of the invention a rib 17 is formed integrally with the body part 6 on the underside thereof, the rib being located at the trailing edge 10 of the body part and being interrupted by the recesses 12 formed therein. The rib 17 has a bore 18 in the length thereof which provides a socket at opposite ends of each recess 12 to receive the pivots 16. In this embodiment of the invention the rib 17 is part circular in cross-section (FIG. 3).

With this form of structure, the body part 6 may be made from plastics material in an extrusion process, which is relatively inexpensive. After extrusion, the recesses 12 may simply be cut from the trailing edge 10 of the body part.

The pivots 16 are in this embodiment of the invention formed integrally with the flaps 14 and project from shoulders 20 located at opposite ends of each flap 14. Each flap may be made from a hard, resiliently flexible material such as polycarbonate. A suitable method of making the flaps may be by means of an injection moulding process. To mount a flap 14 on the body part 6, one of its pivots 16 may be inserted in the associated bore 18 of the rib 16, the flap may be bent to shorten its effective length and its other pivot may thereafter be inserted in the opposite bore 18 (FIG. 2).

Figure 4:
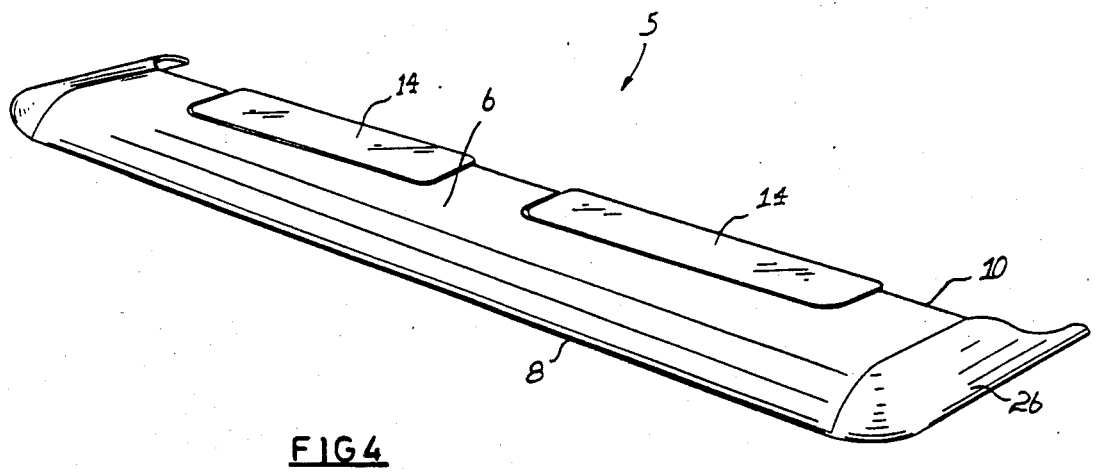
FIG. 4 is a perspective view of the assembly of FIG. 1 in assembled form and seen from above.

Once the flap is released, it resums its operative shape (FIG. 4). If necessary, the bore 18 of the rib 17 may be reamed prior to mounting of the flaps 14 to ensure the required tight fit of the pivots 16 in the bore 18 of the rib.

To enhance frictional contact between the flap 14 and the ends of the recess, washers 28 with curved planes are provided on the pivots 16. The frictional contact assists the flap in remaining in a selected orientation relative to the body member 6.

The body part 6 may conveniently be mounted on a length of beading 22 which may be secured by rivettng or otherwise to the roof 1 of a vehicle (FIG. 1). The beading 22 may have upstanding flanges 23 with outwardly directed lips 24. The body part 6 may have inwardly directed lips 25 projecting from the leading edge and from a downwardy directed flange 26 spaced from the leading edge. Thus, the body part 6 may be slidingly engaged with the beading 22, with the lips 24, 25 interengaging. To complete the structure, end caps 26 may be fitted in any suitable manner to the ends of the body part 6. Each end cap may be provided with projections 29 adapted to engage with the end of the body member 6 to ensure a positive fit therewith. Each end cap may also have a lug 30 adapted to engage in the bore 18 of the rib 17 of the body member.

If desired, the pivots 16 of the flaps 14 may be more or less centrally located thereon. In use, such an arrangement will serve to balance the flap when it is angularly disposed relative to the body member 6, since wind forces on the flap will tend to be more or less equal above and below the pivots 16.

Many other embodiments of the invention may be made differing in matters of detail only from that described above and without departing from the scope of the invention as defined in the appended claims.

I claim:

1. An air deflector, suitable for mounting adjacent an opening in the roof of a motor vehicle, comprising: a body member (6) having a leading edge (8) and a trailing edge (10), a recess (12) formed in the trailing edge, and a flap (14) accommodated in the recess and pivotaby connected to the body member on pivots (16) at opposite ends of the flap, the body member having sockets formed integrally therewith at opposite ends of the recess, the pivots being received in the sockets, and the body member having a rib (17) thereon extending along the length of the body member, the rib being interrupted by the recess formed in the trailing edge, the rib having a bore (18) in its length, and the bore providing the sockets which receive the pivots on the flap.

2. An air deflector according to claim 1 in which the rib is provided on the underside of the body member and has a part-circular shape in cross-section.

3. An air deflector according to claim 1 in which the body member is made from an extrusion of plastics material, the recess in the trailing edge of the body member being formed therein by cutting a portion of the trailing edge therefrom.

4. An air deflector according to claim 1 in which the rib on the body member is located at the trailing edge of the body member.

5. An air deflector according to claim 1 including a washer having a curved plane located on each pivot of the flap to enhance frictional contact between the flap and the ends of the recess in the body member.

6. An air deflector according to claim 1 including engagement formations on the underside of the body member for sliding engagement of the body member with a beading secured to the roof of the vehicle.

7. An air deflector, suitable for mounting adjacent an opening in the roof of a motor vehicle comprising: a body member (6) having a leading edge (8) and a trailing edge (10), a recess (12) formed in the trailing edge, and a flap (14) accommodated in the recess and pivotably connected to the body member on pivots (16) at opposite ends of the flap, the body member having sockets formed integrally therewith at opposite ends of the recess, the pivots being received in the sockets, the pivots being formed integrally with the flap, and the flap being made of a resiliently flexible material such as polycarbonate to enable the flap to be temporarily bent about its length to shorten its effective length and permit the pivots to be inserted into the sockets, whereafter the flap may be permitted to return to its original shape.

* * * * *